United States Patent [19]

Attwood

[11] Patent Number: 4,833,416
[45] Date of Patent: May 23, 1989

[54] QPSK/BPSK DEMODULATOR

[75] Inventor: Stanley W. Attwood, Sun Lakes, Ariz.

[73] Assignee: Motorola, Inc., Schaumburg, Ill.

[21] Appl. No.: 175,384

[22] Filed: Mar. 30, 1988

[51] Int. Cl.[4] .............................................. H04L 27/22
[52] U.S. Cl. ..................................... 329/50; 329/124; 375/83; 375/87
[58] Field of Search ................. 329/50, 105, 110, 112, 329/122, 124; 375/81, 83, 84, 87, 120

[56] References Cited

U.S. PATENT DOCUMENTS

| 4,053,837 | 10/1977 | Ryan et al. | 375/15 |
| 4,085,378 | 4/1978 | Ryan et al. | 329/124 |
| 4,092,606 | 5/1978 | Ryan | 329/124 |
| 4,359,692 | 11/1982 | Ryan | 329/50 |

Primary Examiner—Siegfried H. Grimm
Attorney, Agent, or Firm—Frank J. Bogacz

[57] ABSTRACT

A quadraphase shift keyed (QPSK) demodulator employs a pseudo data estimation loop for reducing the loop gain variation. This demodulator has a feedback loop to minimize the cross-coupling between the i and q channels. This demodulator also provides as outputs the signals representing the amplitude of i and q channels. In addition, by eliminating amplification of some of the internally generated signals, this demodulator may serve as a biphase shift keyed (BPSK) demodulator.

17 Claims, 1 Drawing Sheet

QPSK/BPSK DEMODULATOR

BACKGROUND OF THE INVENTION

The present invention pertains to quadraphase shift keyed modulators (QPSK) and biphase shift keyed modulators (BPSK) and more particularly to improvements to minimizing errors for data transmission utilizing QPSK and BPSK demodulators.

In transmission systems, signal conditioning for high performance and low signal energy-to-noise power density ratio have typically been treated as of secondary importance. This leads to severe carrier loop parameter variations. Loop gain variations may approach 30 dB.

One QPSK demodulator circuit is shown in U.S. Pat. No. 4,085,378, issued on Apr. 18, 1978 to C. Ryan et al. and assigned to the same assignee as the present application. This patent teaches improvements to the Costas loop demodulator. This patent teaches providing a plurality of adjusting signals for tracking the phase error of the I and Q channels of the demodulator. As a result, much adjusting interconnection must be provided. In addition, the teachings of this patent provide no indication of the production of signals proportional to the amplitude of the data signals.

In addition, U.S. Pat. No. 4,053,837, issued on Oct. 11, 1977 to C. Ryan et al. and assigned to the same assignee as the present invention, teaches an equalizer arrangement for a QPSK demodulator system. Again a plurality of adjustments are derived and no teachings are made as to the amplitude signal production.

Neither reference teaches circuitry which is capable of both QPSK nd BPSK demodulation with minor variations.

Accordingly, it is an object of the present invention to reduce the loop gain significantly for a QPSK and BPSK demodulator while providing minimal control signals and amplitude signals as outputs.

SUMMARY OF THE INVENTION

In accomplishing the object of the present invention, a novel QPSK/BPSK demodulator circuit is shown.

A QPSK demodulator receives an input signal which has two modulated quadrature signals. The QPSK demodulator produces two output signals corresponding to the data of the i and q channels and two amplitude signals corresponding to the i and q channels. The QPSK demodulator includes a splitter which receives the input signal and produces first and second signals. Filters are connected to the splitter and produce filtered versions of the first and second signals.

A plurality of multipliers are connected to the filters in a cross-coupling configuration. First and second amplifiers are connected to two of the multipliers. The multipliers also receive error correcting signals. The output of the amplifiers are the output signals representing the i and q channels.

Two error trackers are connected respectively to the two amplifiers. The error trackers produce error tracking signals which are rapid estimates of the output signals. A plurality of amplifiers is connected to the error trackers and to the filters. Two additional amplifiers are connected to the plurality of amplifiers. The two amplifiers provide for multiplying certain intermediate signals of the plurality of amplifiers by a constant K for QPSK demodulation. For BPSK demodulation, these amplifiers are removed from the circuitry.

Output amplifiers are connected to the two amplifiers and to the plurality of amplifiers. The output amplifiers produce estimate signals which are proportional to the sine and cosine of the tracking error. These estimate signals are fed back to the multipliers to aid in correction of the data detection.

A pair of magnitude amplifiers is connected to the first amplifier pair and to the error tracker. The amplitude amplifiers produce signals which indicate the amplitude of the i and q channels.

DESCRIPTION OF THE PREFERRED EMBODIMENT

Figure 1:
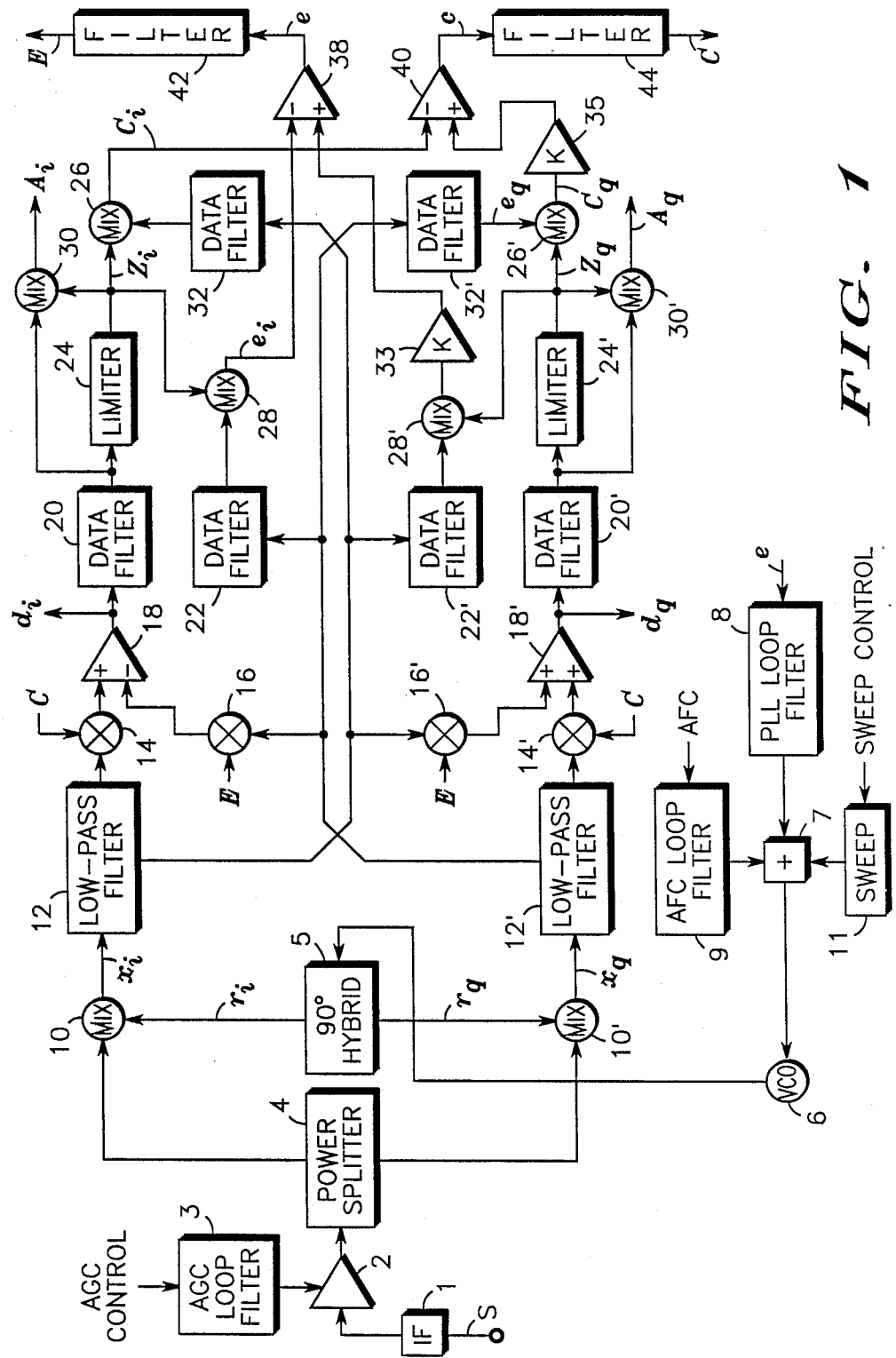
FIG. 1 is a schematic diagram depicting the principles of operation of the present invention.

Referring to FIG. 1, a schematic diagram of the present invention is shown. Time-varying signal s which also includes a noise component is applied to the IF stage 1. IF 1 is connected to IF amplifier 2. An automatic grain control signal is applied to AGC loop filter 3 and in turn to amplifier 2. The output of amplifier 2 is connected to power splitter 4. The output of power splitter 4 is uniformly applied to quad mixers 10 and 10'. Mixers 10 and 10' have their inputs connected to power splitter 4. Mixers 10 and 10' also have a multiplying input which is connected to 90° Hybrid 5. Multipliers 10 and 10' provide a change in output, only if the input from power splitter 4 changes. The signals $r_i$ and $r_q$ input to mixers 10 and 10', respectively, are always 90° out-of-phase. $r_i$ leads $r_q$ by 90°.

90° Hybrid 5 has an input from voltage controlled oscillator 6. VCO 6 has an input from summing circuit 7. Summing circuit 7 adds the inputs from AFC loop filter 9, sweep circuit 11 and phase lock loop filter 8. Phase lock loop filter 8 may take several known forms: Type I, Type I 2nd order, Type II, as shown, and Type III, etc. Phase lock loop filter 8 has as an input the e signal. The derivation of the e signal will be explained infra.

Low-pass filters 12 and 12' are connected via the baseband signal leads $x_i$ and $x_q$ to mixers 10 and 10', respectively. Low-pass filters 12 and 12' eliminate harmonics signals at twice the VCO 6 frequency. The outputs of low-pass filters 12 and 12' are applied to an input of four-quadrant multipliers 14 and 14', respectively. Four-quadrant multipliers 14 and 14' have two inputs each. The other input to four-quadrant multipliers 14 and 14' is the C signal. The output of four-quadrant multipliers 14 and 14' changes as either of its inputs to the multiplier changes.

The output of low-pass filter 12 is also connected to four-quadrant multiplier 16', data filter 22' and data filter 32. The output of low-pass filter 12' is also connected to four-quadrant multiplier 16, data filter 22 and data filter 32'. The other input to four-quadrant multipliers 16 and 16' is the E signal. The E signal is equal to a constant times the sine of the tracking phase error estimate. The C signal, which is applied as an input to four-quadrant multipliers 14 and 14', is equal to the same constant times the cosine of the estimated tracking phase error.

The output of multiplier 14 is applied to the positive input of difference amplifier 18. The output of multiplier 16 is applied to the negative input of difference amplifier 18. The output of difference amplifier 18 is the $d_i$ output which is the data of the i channel. It basically contains no cross modulation terms.

The output of multiplier 16' is connected to a positive input of summing amplifier 18'. The output of multiplier 14' is connected to another positive input of summing amplifier 18'. The output of summing amplifier 18' is the $d_q$ signal which is the data of the q channel. It basically contains no cross modulation terms.

The $d_i$ and $d_q$ signals are further applied to data filters 20 and 20', respectively. The output of data filter 20 is transmitted to limiter 24 and to mixer 30. The output of data filter 20' is transmitted to limiter 24' and to mixer 30'. The outputs of limiters 24 and 24' are the $Z_i$ and $Z_q$ signals, respectively. The $Z_i$ and $Z_q$ signals are close estimates of the data contained in the i and q channels, without the first order q-to-i or i-to-q cross-coupling normally observed with quadraphased demodulators.

Limiter 24 is connected to mixers 26, 28 and 30. Limiter 24' is connected to mixers 26', 28' and 30'. When the filtered version of the i channel data, $d_i$ signal, of data filter 20 and the $Z_i$ signal are applied to mixer 30, the $A_i$ signal is produced. The $A_i$ signal is the amplitude of the i channel. It contains no cross modulation terms. Similarly, when the filtered version q channel data, $d_q$ signal, of data filter 20' and the $Z_q$ signal are applied to mixer 30', the result is the $A_q$ signal. The $A_q$ signal is the amplitude of the q channel. It contains no cross modulation terms. $A_q/A_i$ is a proper measure for K. It may be used to control the gain of the K amplifiers 35 and 33.

Data filters 22 and 22' have their outputs connected to mixers 28 and 28', respectively. Mixer 28 produces the $e_i$ output which is transmitted to difference amplifier 38. The output of data filter 32' is the $e_q$ signal which is transmitted to mixer 26'. The $e_i$ and $e_q$ signals are tracking error estimates proportional to the sine of the phase tracking error. $e_i$ and $e_q$ contain data modulation residuals.

Data filter 32 is connected to mixer 26. Mixer 26 produces the $C_i$ signal at its output. Similarly, the $Z_q$ and $e_q$ signals are applied to the inputs of mixer 26'. As a result, the $C_q$ signal is produced. The $C_q$ signal is transmitted from mixer 26' to summing amplifier 40. Signals $C_i$ and $C_q$ are low pass signals which are tracking error estimates proportional to the i and q channel levels and also proportional to the cosine of the phase tracking error, but contain data modulation residuals.

The output of mixer 28' is connected to amplifier 33. Amplifier 33 multiplies the output of mixer 28' by a constant K and transmits the result to difference amplifier 38. Amplifier 38 produces the e signal at its output. The e signal has no data modulation residuals although $e_i$ and $e_q$ do. The e signal is filtered to produce the E signal which is applied to multipliers 16 and 16' to adjust the tracking error as previously mentioned. The E signal is the value of the constant K multiplied by the sine of the phase tracking error. The $c_q$ signal, output from mixer 26' is transmitted to amplifier 35. Amplifier 35 multiplies the $c_q$ signal by a constant K. A value of K = 1 indicates standard QPSK modulation. If K = 0, standard BPSK modulation is indicated. If K is not equal to 0 or 1, unbalanced QPSK modulation is indicated. The output of amplifier 35 is transmitted to summing amplifier 40. Summing amplifier 40 combines the $c_i$ signal output from mixer 26 with the output of amplifier 35 to produce the c signal. The c signal has no data modulation residuals although $e_i$ and $e_q$ do. The c signal is filtered to produce the C signal which is applied to multipliers 14 and 14' to adjust the tracking error as previously mentioned. The C signal is the constant K times the cosine of the phase tracking error. Amplifiers 33 and 35 cancel these modulation residuals.

In addition, the e signal is transmitted to phase lock loop filter 8 for adjusting the voltage controlled oscillator 6. The constant K is an apriori estimate of k which is the voltage ratio of the q channel level with respect to the i channel level. The constant K may be estimated by $C_i$–$C_q$. The constant K is in the range of 0 to 1 (for $A_i$ greater than or equal to $A_q$). If $A_i$ is less than $A_q$, then K becomes greater than 1. In this case, the demodulation changes the i channel into the q channel and the q channel into the i channel. The $A_i$, $A_q$, c and e signals are used to control the demodulator and provide feedback signals to improve the data estimator and to cancel i and q channel data cross-coupling.

This circuitry may also be employed for biphase shift key (BPSK) demodulation which is a degenerate case of quadraphase shift key demodulation. For a BPSK demodulation, the constant K is equal to zero and as a result the following components are removed from the circuit for the BPSK configuration: multipliers 14' and 16'; amplifiers 18', 40, 33 and 35; data filters 20', 22' and 32'; mixers 26', 28' and 30'; and limiter 24'. The C signal then becomes just a filtered (through filter 44) version of the $c_i$ signal.

The $A_i$, $A_q$, C and E signals may be used for gain control of amplifiers 33 and 35 and for automatic gain control of the circuit.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A QPSK demodulator for receiving an input signal having two modulated quadrature signals and for producing demodulated first and second output signals and corresponding first and second amplitude signals, said QPSK demodulator comprising:

splitting means having an input coupled to receive said input signal, said splitting means operating to produce first and second signals;

first and second filter means connected to said splitting means, said first and second filter means producing first and second filtered signals respectively;

first, second, third and fourth multiplying means each having two inputs and one output, an input of said first and third multiplying means being connected to said first filter means and an input of said second and fourth multiplying means being connected to said second filter means;

first and second amplification means, said first amplification means connected to said outputs of said first and second multiplying means, said second amplification means being connected to said outputs of said third and fourth multiplying means, said first and second amplification means respectively operating to produce said first and second output signals representing data portions of said modulated quadrature signals without cross modulation of said first and second output signals;

first and second error tracking means, said first error tracking means being connected to said first amplification means and said second error tracking means being connected to said second amplification means, said first and second error tracking means operating to produce first and second error tracking signals being estimates of said first and second output signals respectively without cross modulation of said first and second output signals;

third, fourth, fifth and sixth amplification means each having an input, a control and an output, said first error tracking means being connected to said input terminal of said third amplification means and to said control of said fourth amplification means, said second error tracking means being connected to said input of said sixth amplification means and to said control of said fifth amplification means, said control of said third amplification means being connected to said first filter means, said input of said fourth amplification means being connected to said second filter means, said input of said fifth amplification means being connected to said first filter means and said control of said sixth amplification means being connected to said second filter means;

seventh and eighth amplification means, said seventh amplification means being connected to said output of said sixth amplification means and said eighth amplification means being connected to said output of said fifth amplification means, said seventh and eighth amplification means respectively operating to multiply said first and second error tracking signals by a predetermined constant K;

ninth and tenth amplfication means, said ninth amplification means connected to said fourth amplification means and to said eighth amplification means, said ninth amplification means operating to produce a first estimate signal which is proportional to the sine of said first tracking error signal, said tenth amplification means being connected to said seventh amplification means and to said third amplification means, said tenth amplification means operating to produce a second error estimate which is proportional to the cosine of said second tracking error signal;

said ninth amplification means being connected to the second inputs of said second and third multiplying means and said tenth amplification means being connected to the second inputs of said first and fourth multiplying means; and eleventh and twelfth amplification means each having an input, a control and an output, said first amplification means being connected to said input of said eleventh amplification means, said first error tracking means being connected to said control of said eleventh amplification means, said second amplification means being connected to said input of said twelfth amplification means, said second error tracking means being connected to said control of said twelfth amplification means, said eleventh and twelfth amplification means respectively operating to produce said first and second amplitude signals corresponding to said first and second output signals without cross modulation of said first and second output signals.

2. A QPSK demodulator as claimed in claim 1, wherein there is further included voltage controlled oscillator means connected between said eleventh amplification means and said splitting means, said voltage controlled oscillator means providing a control signal which is proportional to a phase tracking error.

3. A QPSK demodulator as claimed in claim 2, said voltage controlled oscillator means including:
phase locked loop filter means connected to said ninth amplification means;
sweep control circuit means;
AFC loop filter means; and
summing means connected to said phase locked loop filter means, to said sweep circuit means and to said AFC loop filter means.

4. A QPSK demodulator as claimed in claim 3, said splitting means including:
power splitting means coupled to receive said input signal;
fifth and sixth multiplying means each connected to said power splitting means, said fifth multiplying means being connected to said first filter means and said sixth multiplying means being connected to said second filter means; and
Hybrid means connected between said voltage controlled oscillator means and said fifth and sixth multiplying means, said Hybrid means operating in response to said voltage controlled oscillator means to produce a first Hybrid signal which is proportional to the cosine of said tracking error signal for transmission to said fifth multiplying means and to produce a second Hybrid signal which is proportional to the sine of said tracking error signal for transmission to said sixth multiplying means.

5. A QPSK demodulator as claimed in claim 1, said first amplification means including:
first amplifier means; and
third filter means connected to said first amplifier means, to said first error tracking means and to said eleventh amplification means.

6. A QPSK demodulator as claimed in claim 5, said second amplification means including:
second amplifier means; and
fourth filter means connected to said second amplifier means, to said second error tracking means and to said twelfth amplification means.

7. A QPSK demodulator as claimed in claim 6, wherein there is further included:
fifth filter means connected between said second filter means and said fourth amplification means; and
sixth filter means connected between said first filter means and said fifth amplification means.

8. A QPSK demodulator as claimed in claim 7, wherein there is further included:
seventh filter means connected between said first filter means and said third amplification means; and
eighth filter means connected between said second filter means and said sixth amplification means.

9. A QPSK demodulator as claimed in claim 8, wherein there is further included:
ninth filter means connected to said ninth amplification means and to said second and third multiplying means; and
tenth filter means connected to said tenth amplification means and to said first and fourth multiplying means.

10. A QPSK demodulator as claimed in claim 1, said predetermined constant K being in the range between 0 and 1.

11. A BPSK demodulator for receiving an input signal having a modulated signal and for producing a demodulated output signal and a corresponding amplitude signal, said BPSK demodulator comprising:

splitting means having an input coupled to receive said input signal, said splitting means operating to produce first and second signals;

first and second filter means connected to said splitting means, said first and second filter means producing first and second filtered signals respectively;

first and second multiplying means each having two inputs and one output, an input of said first multiplying means being connected to said first filter means and an input of said second multiplying means being connected to said second filter means;

amplification means, said amplification means connected to said output of said first and second multiplying means, said amplification means operating to produce said output signal representing a data portion of said modulated signal;

error tracking means, said error tracking means being connected to said first amplification means, said error tracking means operating to produce an error tracking signal being an estimate of said output signal;

second and third amplification means each having an input, a control and an output, said error tracking means being connected to said input terminal of said second amplification means and to said control of said third amplification means, said control of said second amplification means being connected to said first filter means, said input of said third amplification means being connected to said second filter means;

fourth amplification means, said fourth amplification means connected to said third amplification means, said fourth amplification means operating to produce an estimate signal which is proportional to the sine of said tracking error signal;

said fourth amplification means being connected to the second input of said second multiplying means and said second amplification means being connected to the second input of said first multiplying means; and fifth amplification means having an input, a control and an output, said first amplification means being connected to said input of said fifth amplification means, said error tracking means being connected to said control of said fifth amplification means, said fifth amplification means operating to produce said amplitude signal corresponding to said output signal.

12. A BPSK demodulator as claimed in claim 11, wherein there is further included voltage controlled oscillator means connected between said fourth amplification means and said splitting means, said voltage controlled oscillator means providing a control signal which is proportional to a phase tracking error.

13. A BPSK demodulator as claimed in claim 12, said voltage controlled oscillator means including:
phase locked loop filter means connected to said fourth amplification means;
sweep control circuit means;
AFC loop filter means; and
summing means connected to said phase locked loop filter means, to said sweep circuit means and to said AFC loop filter means.

14. A BPSK demodulator as claimed in claim 13, said splitting means including:
power splitting means coupled to receive said input signal;
third and fourth multiplying means each connected to said power splitting means, said third multiplying means being connected to said first filter means and said fourth multiplying means being connected to said second filter means; and
Hybrid means connected between said voltage controlled oscillator means and said third and fourth multiplying means, said Hybrid means operating in response to said voltage controlled oscillator means to produce a first Hybrid signal which is proportional to the cosine of said tracking error signal for transmission to said third multiplying means and to produce a second Hybrid signal which is proportional to the sine of said tracking error signal for transmission to said fourth multiplying means.

15. A BPSK demodulator as claimed in claim 11, said first amplification means including:
first amplifier means; and
third filter means connected to said first amplifier means, to said error tracking means and to said fifth amplification means.

16. A BPSK demodulator as claimed in claim 15, wherein there is further included:
fourth filter means connected between said second filter means and said third amplification means; and
fifth filter means connected between said first filter means and said second amplification means.

17. A BPSK demodulator as claimed in claim 16, wherein there is further included:
sixth filter means connected between said fourth amplification means and said second multiplying means; and
seventh filter means connected between said second amplification means and said first multiplying means.

* * * * *